United States Patent Office.

WARREN P. SIGSBY, OF DELTA, OHIO.

Letters Patent No. 95,610, dated October 5, 1869.

IMPROVED COMPOUND FOR CURING TOOTHACHE.

The Schedule referred to in these Letters Patent and making part of the same.

To all whom it may concern:

Be it known that I, WARREN P. SIGSBY, of Delta, in the county of Fulton, and State of Ohio, have invented a new and valuable Improvement in Means for Curing Toothache, and killing the nerve; and I do hereby declare that the following is a full, clear, and exact description of the construction and operation of the same.

My invention has relation to means for curing toothache; and

It consists mainly in constructing a paste of novel ingredients, to be inserted in the hollow of a decaying tooth, to kill the nerve, and prepare such nerve for extraction without pain.

My paste is formed as follows, namely:

I take, by weight, one-fifth of green mullen-root, thoroughly baked and finely pulverized, two-fifths of green blackberry-root, prepared in the same manner as the mullen-root, and two-fifths of black onion-seed.

These ingredients I mix thoroughly with mutton-tallow, until the compound forms a thick paste suitable for dividing into small pills, adapted to the cavity I propose to fill in the tooth.

The onion-seed must be pulverized, so as to mix readily with the other ingredients.

When thus prepared, I place a small pellet of the mixture in the hollow of the decaying tooth, as near the nerve as possible, and keep it there till the nerve drops and the tooth ceases to give pain. I then wash the mixture from the mouth.

A slight tenderness or soreness will follow for about twenty-four hours, when the tooth will cease to ache forever.

The cavity should now be filled by a competent dentist, and the tooth will be preserved for an indefinite length of time.

The paste should be melted, and poured into the cavity of the tooth while it is hot.

The proportions above given are not arbitrary, but the ingredients may be mixed in various proportions, and still accomplish the desired result. It is the compounding of the ingredients, in any proportions, which I desire to patent.

What I claim as my invention, and desire to secure by Letters Patent, is—

The paste, or pellets herein described, compounded of the ingredients and in the manner substantially as herein specified.

In testimony that I claim the above, I have hereunto subscribed my name, in the presence of two witnesses.

WARREN P. SIGSBY.

Witnesses:
 H. L. ALDRICH,
 W. HENRY HANDY.